(12) United States Patent
Nakamura et al.

(10) Patent No.: US 7,999,978 B2
(45) Date of Patent: Aug. 16, 2011

(54) MATRIX COEFFICIENT DETERMINING METHOD AND IMAGE INPUT APPARATUS

(75) Inventors: Tomokazu Nakamura, Asaka (JP); Makoto Oishi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1173 days.

(21) Appl. No.: 11/258,896

(22) Filed: Oct. 27, 2005

(65) Prior Publication Data

US 2006/0092444 A1 May 4, 2006

(30) Foreign Application Priority Data

Oct. 29, 2004 (JP) .................................. 2004-316856

(51) Int. Cl.
*G03F 3/08* (2006.01)

(52) U.S. Cl. ....... 358/518; 358/1.1; 358/1.9; 348/221.1; 348/223.1; 348/224.1; 348/227.1; 348/222.1; 382/163; 382/166; 382/162

(58) Field of Classification Search .................. 358/518, 358/1.9, 1.1; 348/222.1, 223.1
See application file for complete search history.

(56) References Cited

U.S. PATENT DOCUMENTS

| 5,668,596 | A | * | 9/1997 | Vogel ........................ 348/222.1 |
| 5,805,213 | A | * | 9/1998 | Spaulding et al. ......... 348/222.1 |
| 6,459,449 | B1 | | 10/2002 | Juen | |
| 2003/0193579 | A1 | * | 10/2003 | Mori et al. ................ 348/222.1 |
| 2006/0012808 | A1 | | 1/2006 | Mizukura et al. | |

FOREIGN PATENT DOCUMENTS

| JP | 8-111812 A | 4/1996 |
| JP | 10-191378 A | 7/1998 |
| JP | 11-113005 A | 4/1999 |
| JP | 2001-358960 A | 12/2001 |
| JP | 2002-354491 A | 12/2002 |
| JP | 2003-284084 A | 10/2003 |
| JP | 2004-208079 A | 7/2004 |

* cited by examiner

*Primary Examiner* — Benny Q Tieu
*Assistant Examiner* — Paul F Payer
(74) *Attorney, Agent, or Firm* — Birch, Stewart, Kolasch & Birch, LLP

(57) ABSTRACT

The matrix coefficient determining process of the present invention can determine linear matrix and color-difference matrix coefficients appropriate for a given type of light source at the same time. The coefficients can be used to perform color correction of RAW data to ensure good color reproduction. Furthermore, by performing the matrix coefficient determining process for a number of types of light sources, optimum color reproduction coefficients and for each of the light sources can be obtained.

9 Claims, 4 Drawing Sheets

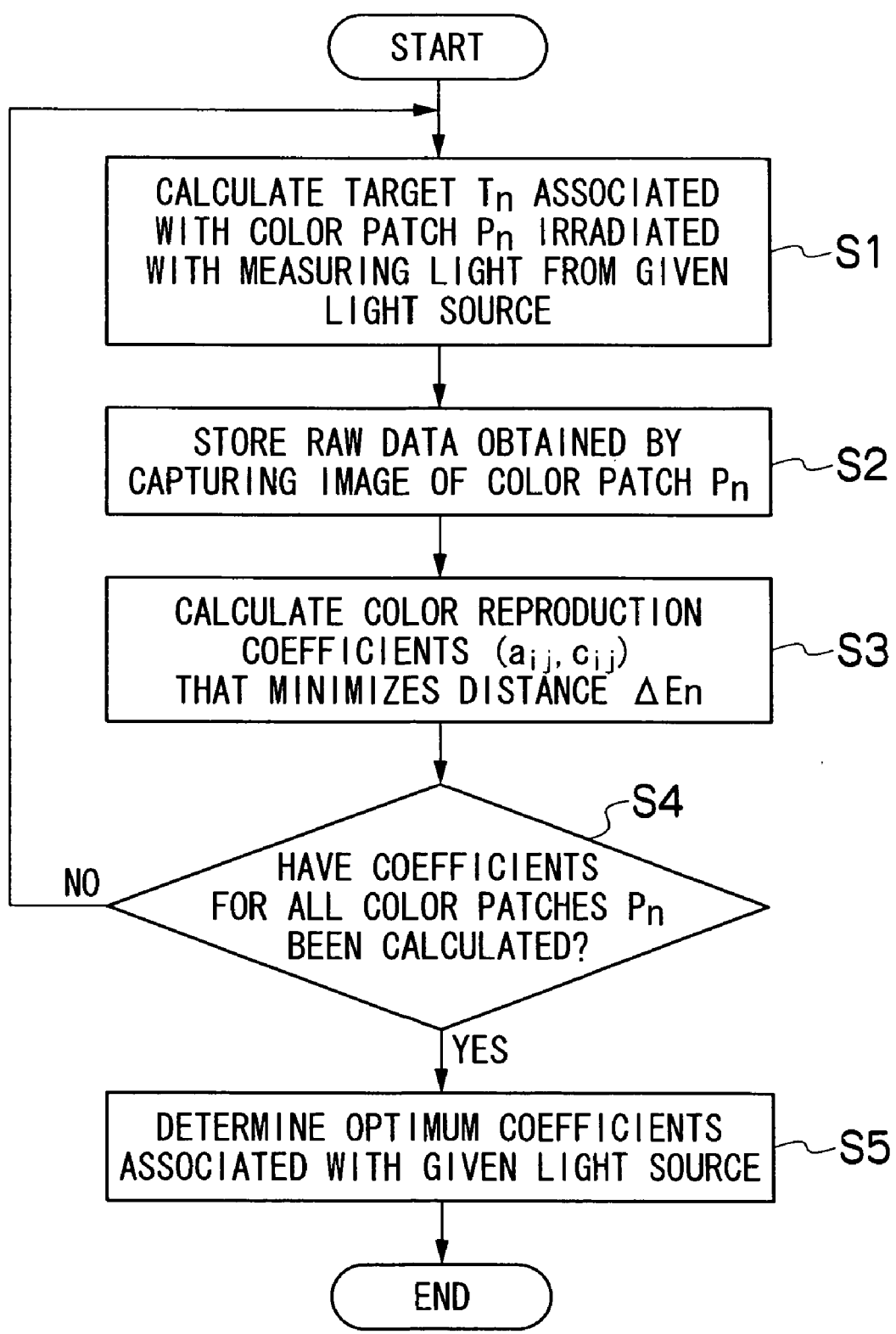

COEFFICIENT TABLE

FIG.3A

| LIGHT SOURCE | LINEAR MATRIX |
|---|---|
| D65 | $a_{ij}^{65}$ |
| D55 | $a_{ij}^{55}$ |
| ... | ... |

| LIGHT SOURCE | COLOR-DIFFERENCE MATRIX |
|---|---|
| D65 | $c_{ij}^{65}$ |
| D55 | $a_{ij}^{55}$ |
| ... | ... |

310a

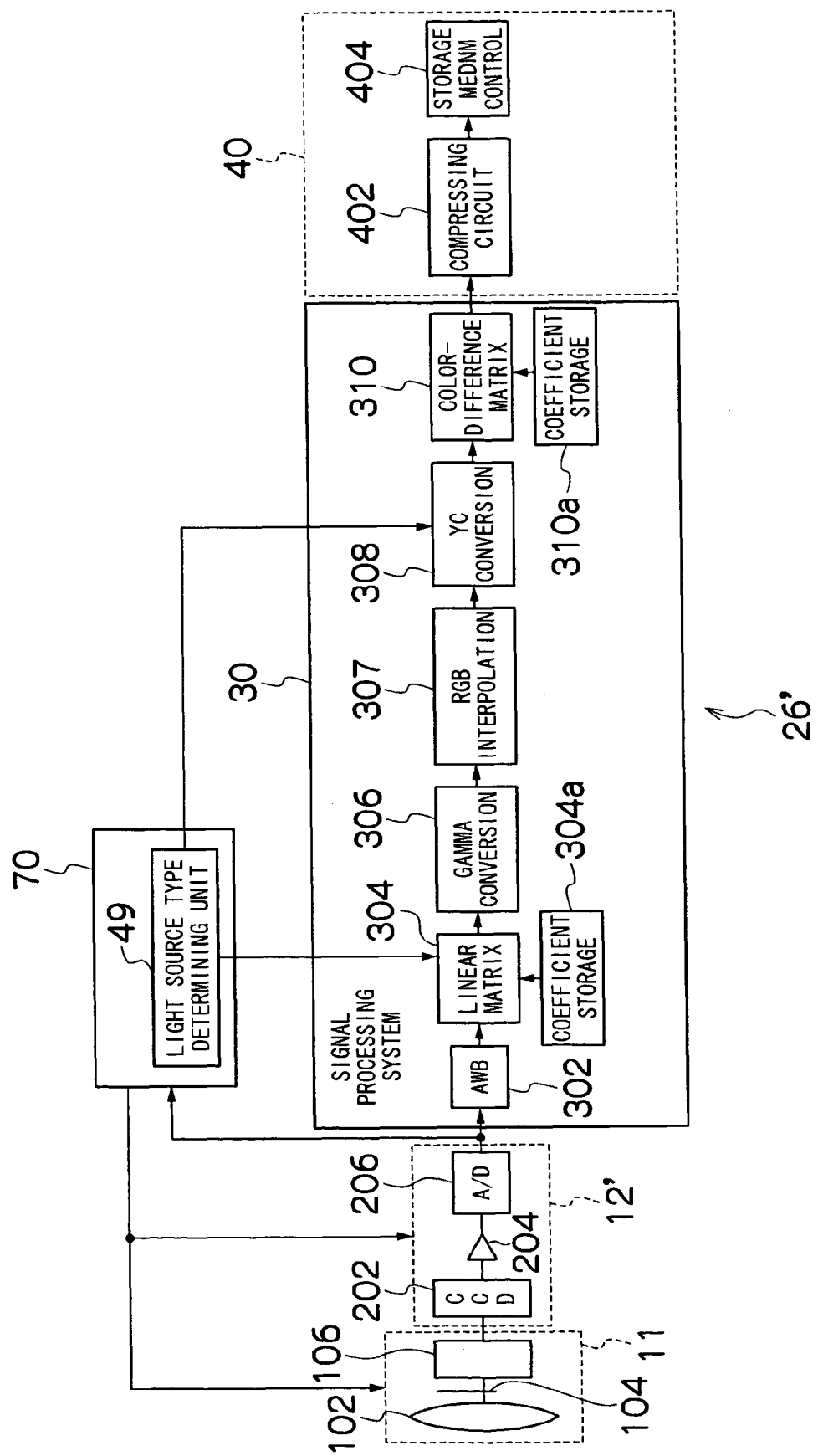

MATRIX COEFFICIENT DETERMINING METHOD AND IMAGE INPUT APPARATUS

BACKGROUND OF THE INVENTION

1. Field of the Invention

The present invention relates to a matrix coefficient determining method and an image input apparatus and, in particular, to a technique of determining linear matrix coefficient and a color-difference matrix coefficient for achieving desired color reproduction.

2. Description of the Related Art

Various techniques for improving color representation by imaging apparatuses have been devised. For example, according to Japanese Patent Application Laid-Open No. 2004-208079, an imaging apparatus including color filters with different spectral characteristics and having an image pickup device for picking up an image of a subject includes an adjusting unit for adjusting a color reproduction value and a noise value which represents perceived noise, a matrix coefficient determining unit for determining a matrix coefficient on the basis of the adjustment by the adjusting unit, and a matrix conversion unit for applying a matrix conversion process to the image picked up by the image pickup device on the basis of the matrix coefficient.

SUMMARY OF THE INVENTION

According to the technique disclosed in Japanese Patent Application Laid-Open No. 2004-208079, a color reproduction value and a noise value are adjusted adaptively to an image pickup environment, and the adjusted values are used to determine a linear matrix coefficient, which is then used to perform matrix operation of the RGB values of the image. However, with the technique in Japanese Patent Application Laid-Open No. 2004-208079, it is difficult to determine precise linear matrix and color-difference coefficients for achieving desired color reproduction. The present invention has been made in light of the problem and an object of the present invention is to provide a linear matrix coefficient and at the same time a color-difference matrix coefficient that can achieve good color reproduction with any imaging light sources.

To solve the problem, the present invention provides a matrix coefficient determining method for an image input apparatus having a signal processing system including a linear matrix conversion unit which converts R, G, and B color signals by using a 3×3 linear matrix coefficient and a color-difference matrix conversion unit which converts color-difference signals Cr, Cb by using a 2×2 color-difference matrix coefficient, the method comprising the steps of: (a) determining a target value of a color to be corrected in a uniform color space, on the basis of a given spectral reflectance, spectral radiance, and color matching function; (b) obtaining R, G, and B RAW data by capturing an image of a color patch of the color to be corrected, under a light source of a type associated with the given spectral radiance; (c) performing signal processing of the obtained RAW data by a signal processing system equivalent to the signal processing system to obtain a luminance signal and a color-difference signal; (d) obtaining coordinates in the uniform color space that correspond to the luminance signal and the color-difference signal; (e) obtaining a distance between the target value and the coordinates in the uniform color space; and (f) optimizing a 3×3 linear matrix coefficient and a 2×2 color-difference matrix coefficient for the type of light source on the basis of the distance between the target value and the coordinates in the uniform color space that are obtained by repeating steps (a) to (e) for each of a plurality of colors to be corrected.

According to the matrix coefficient determining method of the present invention, an optimum linear matrix and color-difference matrix coefficients appropriate for a given type of light source can be determined at the same time. By using the coefficients to perform color correction of RAW data, good color reproduction can be ensured.

Step (f) may obtain a 3×3 linear matrix coefficient and a 2×2 color-difference matrix coefficient that minimize the average value of distances obtained for the plurality of colors.

The matrix coefficient determining method of the present invention may further comprise the step of (g) storing the 3×3 linear matrix coefficient and 2×2 color-difference matrix coefficient that are optimized for each of a plurality of types of light sources by repeating steps (a) to (f) for each of a plurality of given spectral radiances.

By performing the matrix coefficient determining method for each of a number of types of light sources, a linear matrix coefficient and 2×2 color-difference matrix coefficient appropriate for each of the light sources can be obtained.

To solve the above-described problem, the present invention also provides an image input apparatus having a signal processing system including a linear matrix conversion unit which converts R, G, and B color signals by using a 3×3 linear matrix coefficient and a color-difference matrix conversion unit which converts color-difference signals Cr, Cb by using a 2×2 color-difference matrix coefficient, the image input apparatus comprising: a light-source-type determining unit which determines the type of light source; and a coefficient storage unit for storing a linear matrix coefficient and a color-difference coefficient optimized for each of a plurality of types of light sources; wherein the linear matrix conversion unit sets a linear matrix coefficient optimized for the determined type of light source; and the color-difference matrix conversion unit sets a color-difference matrix coefficient for the determined type of light source.

The image input apparatus of the present invention sets optimum linear matrix and color-difference matrix coefficients appropriate for the determined light source. Good color reproduction can be ensured by applying color correction appropriate for the type of light source to optical data.

In the image input apparatus of the present invention, the light-source-type determining unit may determine the type of light source on the basis of spectral radiance.

In the image input apparatus of the present invention, it is preferable that the coefficient storage unit stores a 3×3 linear matrix coefficient and a 2×2 color-difference matrix coefficient that are optimized for each of a plurality of types of light sources by the matrix coefficient determining method according to the present invention.

According to the present invention, an optimum linear and color-difference matrix coefficients appropriate for a given type of light source can be determined at the same time. By using the coefficients to perform color correction of RAW data, good color reproduction can be ensured.

BRIEF DESCRIPTION OF THE DRAWINGS

FIG. 2 is a flowchart showing a flow of process for determining matrix coefficients;

FIGS. 3A and 3B are diagrams for illustrating a concept of coefficient tables; and FIG. 4 is a block diagram schematically showing a configuration of a digital camera according to a preferred embodiment of the present invention.

DETAILED DESCRIPTION OF THE PREFERRED EMBODIMENTS

Figure 1:
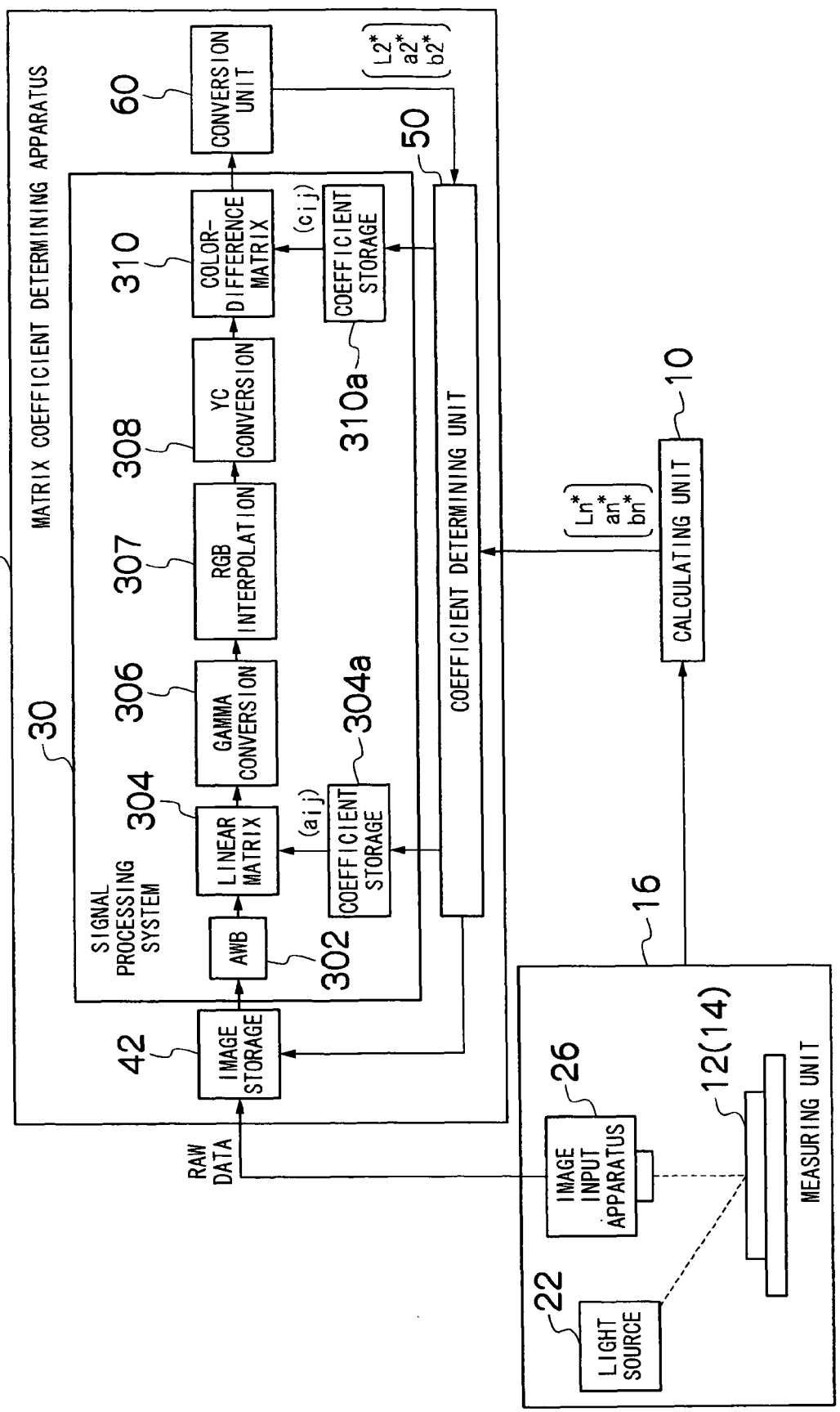
FIG. 1 is a block diagram schematically showing a configuration of a matrix coefficient determining apparatus according to a preferred embodiment of the present invention.

A preferred embodiment of the present invention will be described with reference to the accompanying drawings.

[Outline of Configuration]

FIG. 1 is a block diagram schematically showing a matrix coefficient determining apparatus 100 according to a preferred embodiment of the present invention. The matrix coefficient determining apparatus 100 includes an image storage unit 42, a signal processing system 30, a coefficient determining unit 50, and a conversion unit 60. The matrix coefficient determining unit 100 is connected to an image input apparatus 26 and a calculating unit 10. The image input apparatus 26, which may be a scanner, TV camera, still camera, or CCD camera or the like, captures an image of a subject to be processed in an optical system, obtains optical data, converts the optical data with an A/D converter, not shown, into digital data, and outputs the digital data to the matrix coefficient determining apparatus 100. The optical color data is color mixture data indicating a color proportion mixture of the tree primary colors: red (R), green (G), and blue (B). For example, if the image input apparatus 26 is a CCD camera, the CCD camera provides CCD-RAW data obtained by capturing an image of a color chart 14 to the matrix coefficient determining apparatus 100.

The image storage unit 42 of the matrix coefficient determining unit 100 stores optical data from the image input apparatus 26 in a data format that is in the form of image signals corresponding to a pixel configuration (this data is referred to as RAW data) without change. The signal processing system 30 is a data processing circuit for processing RAW data stored in the image storage unit 42. The signal processing system includes a white balance (AWB) circuit 302, a linear matrix circuit 304, a gamma conversion circuit 306, an RGB interpolation circuit 307, an YC conversion circuit 308, and a color-difference matrix circuit 310. The signal processing system 30 may be hardware circuitry or software.

The white balance circuit 302 is a color correction circuit which corrects color data on each pixel to a value in accordance with a given light source 22. The linear matrix circuit 304 is a color processing circuit which multiplies image data from the white balance circuit 302 by a color reproduction coefficient ($a_{ij}$) to apply color correction to the image data. The color reproduction coefficient ($a_{ij}$) is set by the coefficient determining unit 50 and stored in the coefficient storage unit 304a.

The gamma conversion circuit 306 is a tone level conversion circuit which corrects the tone level of image data from the linear matrix circuit 304 in accordance with the tone characteristics of a reproduction display system such as a display device, not shown. The RGB interpolation operation unit 307 applies interpolation to RGB color signals provided from the gamma conversion circuit 306 to obtain RGB color signals at each pixel locations.

The YC conversion circuit 308 is a conversion circuit which converts RGB signals after RGB interpolation into YC data represented by luminance (Y) and color difference (Cr, Cb). The resulting YC data is provided to the color-difference matrix circuit 310. The color-difference matrix circuit 310 is a color processing circuit which applies color correction to an YCrCb image data to enable color reproduction of an YCrCb image with the YC system. Like the linear matrix circuit 304, the color-difference matrix circuit 310 multiplies YCrCb data by a given color reproduction coefficient ($c_{ij}$) which minimize change in color reproduction. The color reproduction coefficient ($c_{ij}$) is set by the coefficient determining unit 50 and stored in the coefficient storage unit 310a. The YC image data subjected to the color processing is provided to the conversion unit 60.

The conversion unit 60 re-converts YC image data subjected to color processing and provided from the color-difference matrix circuit 310 into RGB image data. The conversion unit 60 then converts the RGB data into a tristimulus values (X', Y', Z'), then converts the tristimulus values (X', Y', Z') into uniform-color-space coordinates (L2*, a2*, b2*), and provides the coordinates to the coefficient determining unit 50.

The coefficient determining unit 50 consists of a CPU performing various operations and is connected to the image storage unit 42, conversion unit 60, and signal processing system 30, in particular, to the coefficient storage units 304a and 310a. Processing performed by the coefficient determining unit 50 will be described later.

The measuring unit 16 irradiates a fluorescent-whitener-free reference white plate 12 with measuring light emitted from a given type of light source 22, such as an "A" light source (tungsten), a D65 light source, or an F4 (fluorescent lamp), splits the light reflected from the reference white plate into different wavelengths λ, and measure the spectral reflectance. The calculating unit 10 calculates the spectral radiance $I_0$ (λ) from the measured spectral reflectance. Similarly, the measuring unit 16 applies measuring light from the same light source 22 to a color chart 14 consisting of a number of color patches Pn (n=a number from 1 to 50, for example) formed on desired paper containing a fluorescent whitener, splits light reflected from the color chart 14 into wavelengths λ, and measures the spectral reflectance. The calculating unit 10 calculates the spectral reflectance radiance Is (λ) from the measured spectral reflectance.

The calculating unit 10 calculates the ratio of the spectral radiances $I_0$ (λ) and $I_s$ (λ), namely the spectral emissivity β(λ) of each color patch Pn as $$\beta(\lambda) = I_s(\lambda)/I_0(\lambda) \tag{1}$$

then calculates the tristimulus values Xn, Yn, Zn of the color patch Pn under the given light source 22 having an emission spectrum S(λ) as $$Xn = (1/K) \cdot \int \{S(\lambda) \cdot \beta(\lambda) \cdot x(\lambda)\} d\lambda \tag{2}$$

$$Yn = (1/K) \cdot \int \{S(\lambda) \cdot \beta(\lambda) \cdot y(\lambda)\} d\lambda \tag{3}$$

$$Zn = (1/K) \cdot \int \{S(\lambda) \cdot \beta(\lambda) \cdot z(\lambda)\} d\lambda \tag{4}$$

$$K = [\int \{S(\lambda) \cdot y(\lambda)\} d\lambda]/100 \tag{5}$$

(where the range of the integrals is the visible light range). Here, x(λ), y(λ), and z(λ) are isochromatic functions and the tristimulus values (Xn, Yn, Zn) are image data in CIE XYZ color system specified by the International Commission on Illumination (CIE).

Then, the calculating unit 10 projects the tristimulus values (Xn, Yn, Zn) to a uniform color space (for example, a CIE L* a* b* uniform color space) with its origin at reference white (W0) to convert them into color space data (Ln*, an*, bn*) according to a given conversion equation. The color space data (Ln*, an*, bn*) thus obtained may be represented by a target value Tn in the uniform color space that is associated with to a color patch Pn. The target value Tn is provided to the matrix coefficient determining apparatus 100. The uniform color space is not limited to the CIE L* a* b* uniform color space; any of color spaces, such as a CIE L* u* v* uniform color space, an L* C* H* uniform color space, and a color space based on an appearance model, that is based on reference white can be selected as the uniform color space. When selecting any of these uniform color spaces, the conversion equations given above are adapted to that uniform color space to perform conversion. The calculating section 10 may be integrated with the coefficient determining unit 50.

[Process Flow]

A flow of process for determining matrix coefficients performed in the color correction matrix apparatus 100 will be described below with reference to the flowchart in FIG. 2.

At step S1, the coefficient determining unit 50 inputs a target value Tn (Ln*, an*, bn*), determined by the calculating unit 10, in a uniform color space that is associated with color patches Pn irradiated with light from a light source 22 of a given type.

At step S2, the image storage unit 42 stores RAW data obtained by the image input apparatus 26 capturing an image of a color patch Pn irradiated with light from the light source 22 of a given type.

At step S3, the coefficient determining unit 50 calculates color reproduction coefficients $(a_{ij})$ and $(c_{ij})$ that minimizes the distance (color-difference) between a target value Tn= (Ln*, an*, bn*) associated with a color patch Pn and the coordinates (L2*, a2*, b2*), $\Delta En=\{(Ln*-L2*)^2+(an*-a2*)^2+(bn*-b2*)^2\}^{1/2}$, by using any of various multivariable function minimization algorithms such as the downhill simplex method.

The multivariable function minimization algorithm includes the following steps. First, the coefficient determining units 50 sets predetermined initial values of the color reproduction coefficients $(a_{ij})$ and $(c_{ij})$ and stores in the coefficient storage units 304a and 310a, respectively. Then a signal processing system 30 including a linear matrix 304 and a color-difference matrix 310 for which color reproduction coefficients $(a_{ij})$ and $(c_{ij})$, respectively, are used to process the RAW data and the coordinates (L2*, a2*, b2*) in the color space of the image data resulted from the processing is calculated. Then, the distance $\Delta En=\{(Ln*-L2*)^2+(an*-a2*)^2+(bn*-b2*)^2\}^{1/2}$ is calculated. If the calculated distance $\Delta En$ is not minimal, then the values of the color reproduction coefficients $(a_{ij})$ and $(c_{ij})$ are corrected and the RAW data is processed and the coordinates (L2*, a2*, b2*) and the distance $\Delta En$ are calculated. The calculation of the distance $\Delta En$ is repeated until the color reproduction coefficients $(a_{ij})$ and $(c_{ij})$ that result in the minimum $\Delta En$ is obtained. If a calculated distance $\Delta En$ is minimum, then the minimization algorithm is ended and the color reproduction coefficients $(a_{ij})$ and $(c_{ij})$ that resulted in the minimum distance $\Delta En$ are stored in the coefficient storage units 304a and 310a, respectively. The color reproduction coefficients $(a_{ij})$ and $(c_{ij})$ obtained by using the minimization algorithm are referred to as "color reproduction coefficients $(a_{ij})$ and $(c_{ij})$ appropriate for the color patch Pn".

For some RAW data, color reproduction coefficients $(a_{ij})$ and $(c_{ij})$ that result in a local minimum can be obtained. Therefore, in some cases, color reproduction coefficients $(a_{ij})$ and $(c_{ij})$ set as the initial values for the minimization algorithm may have to be changed.

At step S4, determination is made as to whether or not color reproduction coefficients $(a_{ij})$ and $(c_{ij})$ appropriate for each of the color patches Pn have been calculated. If not, the algorithm returns to step S1 and repeats the process. If color reproduction coefficients $(a_{ij})$ and $(c_{ij})$ appropriate for each of all the color patches Pn have been calculated, the algorithm proceeds to step S5.

At step S5, optimum color reproduction coefficients $(a_{ij})$ and $(c_{ij})$ best adapted to the light source 22 of a given type are chosen from the color reproduction coefficients $(a_{ij})$ and $(c_{ij})$ appropriate for the color patches Pn. The optimum color reproduction coefficients $(a_{ij})$ and $(c_{ij})$ can be chosen in various ways. For example, the color reproduction coefficients $(a_{ij})$ and $(c_{ij})$ appropriate for a certain color patch Pn that have been obtained as described above are set for the linear matrix 304 and the color-difference matrix 310. Then, RAW data obtained by capturing an image of another color patch Pk (k≠n) by the image input apparatus 26 is processed by the signal processing system 30 and then converted into coordinates in the uniform color space. The coordinates are represented by (L3*, a3*, b3*). Then, the distance between a target value Tk=(Lk*, aK*, bk*) associated with the color patch Pk and the coordinates (L3*, a3*, b3*) is obtained as $$\Delta E'k=\{(Lk*-L3*)^2+(ak*-a3*)^2+(bk*-b3*)^2\}^{1/2}$$

Then, the color reproduction coefficients $(a_{ij})$ and $(c_{ij})$ that minimize the average of the distance $\Delta E'k$ $$\Sigma_{k\neq n}\Delta E'k/49$$

are identified and chosen as the optimum color reproduction coefficients.

Alternatively, the color reproduction coefficients $(a_{ij})$ and $(c_{ij})$ that minimize $$\Sigma_{k\neq n}\Delta E'k+\Delta En/50$$

may be identified and chosen as the optimum color reproduction coefficients.

The coefficient determining section 50 associates and stores the optimum color reproduction coefficients $(a_{ij})$ and $(c_{ij})$ with the type of the light source 22 (defined by values such as spectral radiance and color temperature) in the coefficient storages 304a and 310b.

As has been described, the matrix coefficient determining process can determine linear matrix and color-difference matrix coefficients appropriate for a given type of light source at the same time. The coefficients can be used to perform color correction of RAW data to ensure good color reproduction. Furthermore, by performing the matrix coefficient determining process for a number of types of light sources, optimum color reproduction coefficients $(a_{ij})$ and $(c_{ij})$ for each of the light sources can be obtained.

Then, a coefficient table in which optimum color reproduction coefficients $(a_{ij})$ and $(c_{ij})$ for a given type of light source 22 are associated with the type of light source 22 is stored in an image input apparatus 26, a light source determining device which determines the type of light source is provided in the image input apparatus 26, and the color reproduction coefficients $(a_{ij})$ and $(c_{ij})$ appropriate for the type of light source are used to perform color correction of optical data. Thus, good color reproduction appropriate for the type of light source 22 can be achieved. FIGS. 3A and 3B show exemplary coefficient tables. The coefficient table shown in FIG. 3A is stored in the coefficient storage unit 304a and the coefficient table shown in FIG. 3B is stored in the coefficient storage unit 310a.

A configuration of a digital camera, which is an example of an image input apparatus 26, in which these coefficients tables will be described below with reference to FIG. 4. The digital camera 26' includes an optical system 11, an imaging system 12', a signal processing system 30, a recording system 40, and a drive and control system 70. The optical system 11 is a light guiding mechanism that causes an image of a desired subject to enter the imaging system 12', and includes a lens 102, a diaphragm 104, and a shutter 106 in the present embodiment. The lens 102 is an optical lens, which is located substantially in front of a lens-barrel, not shown, preferably includes an infrared cut filter and an optical low-pass filter and produces little noise in visible noise. The diaphragm 104 is a light volume control mechanism which controls the volume of light of an image of a subject that enters through the optical lens 102, and has a number of aperture settings, such as F1.4, F2.0 F2.8 . . . F22. The shutter 106 is an exposure time control mechanism which controls the exposure time of a subject image that enters through the optical lens 102 and the diaphragm 104 and is a mechanical shutter the speed of which can be set incrementally or continuously.

The imaging system 12' is an imaging section which captures an image of a subject that enters through the optical system 11 and converts it into image data that can be electrically processed. In the present embodiment, the imaging system includes an image pickup device 202, an amplifier 204, and an analog-digital converter (A/D) 206. The image pickup device 202 is a photoelectronic transducer which exposes a subject image reaching it through the optical system 11 to light to generate image signal according to the light exposure. The image pickup device 202 may be a solid-state image sensing device such as CCD (Charge Coupled Device). Primary-color or complementary-color filters in given color arrangement are provided over the imaging surface of the image pickup device 202 so that RGB image signals are outputted at each pixel location. The amplifier 204 is an amplifying circuit which amplifies image signals provided from the image pickup device 202. The analog-digital converter 206 is a converting circuit which converts a signal value of each pixel from the amplifier 204 into 10-bit digital data, for example. RAW data representing an image of a subject captured by the imaging system 12' is provided to the signal processing system 30. The signal processing system 30 has a configuration and functions similar to those in FIG. 1 and therefore the description of which will be omitted.

The drive and control system 70 is an imaging control section which drives and controls the optical system 11, the imaging system 12', the signal processing system 30, and the recording system 40 to perform a series of imaging operations. The drive and control system 70 may be implemented by a one-chip microcomputer.

A light-source-type determining unit 49 of the drive and control system 70 determines the type of light source 22 and provides an indication of the type to the linear matrix circuit 304 and the color-difference matrix circuit 310. The light-source-type determining unit 49, as is known, determines the type of light source 22 on the basis of its characteristics such as spectral radiance and color temperature. The linear matrix circuit 304 sets an optimum color reproduction coefficient ($a_{ij}$) appropriate for the light source type provided from the light-source-type determining unit 49. On the other hand, the color-difference matrix circuit 310 sets an optimum color reproduction coefficient ($c_{ij}$) appropriate for the light source type provided from the light-source-type determining unit 49.

The digital camera 26' sets optimum linear matrix and color-difference matrix coefficients appropriate for the type of light source 22. Good color reproduction can be ensured by applying color correction appropriate for the type of light source 22 to optical data.

What is claimed is:

1. A matrix coefficient determining method for an image input apparatus having a signal processing system including a white balance correction unit, a linear matrix conversion unit which converts R, G, and B color signals from the white balance correction unit by using a 3×3 linear matrix coefficient, a circuit which performs gamma correction and pixel interpolation calculation for the R, G, and B signals from the linear matrix conversion unit, a YC conversion unit which converts the R, G, and B signals from the circuit into luminance signal (Y) and color difference signal (Cr, Cb), and a color-difference matrix conversion unit which converts color-difference signals Cr, Cb from the YC conversion unit by using a 2×2 color-difference matrix coefficient, the method comprising the steps of:

(a) determining a target value of a color to be corrected in a uniform color space, on the basis of a given spectral reflectance, spectral radiance, and color matching function;

(b) obtaining R, G, and B RAW data by capturing an image of a color patch of the color to be corrected, under a light source of a type associated with the given spectral radiance;

(c) performing signal processing of the obtained RAW data by the signal processing system to obtain a luminance signal and a color-difference signal which passed through a correction by the white balance correction unit, a conversion by the linear matrix conversion unit, a gamma correction and pixel interpolation calculation by the circuit, and a conversion by the YC conversion unit;

(d) obtaining coordinates in the uniform color space that correspond to the luminance signal and the color-difference signal;

(e) obtaining a distance between the target value and the coordinates in the uniform color space; and (f) simultaneously optimizing a 3×3 linear matrix coefficient performing color correction for the image data before undergoing the gamma correction and a 2×2 color-difference matrix coefficient performing color correction for the image data after undergoing the gamma correction, for the type of light source on the basis of the distance between the target value and the coordinates in the uniform color space that are obtained by repeating steps (a) to (e) for each of a plurality of colors to be corrected.

2. The matrix coefficient determining method according to claim 1, wherein step (f) obtains a 3×3 linear matrix coefficient and a 2×2 color-difference matrix coefficient that minimize the average value of distances obtained for the plurality of colors.

3. The matrix coefficient determining method according to claim 2, further comprising the step of:

(g) storing the 3×3 linear matrix coefficient and 2×2 color-difference matrix coefficient that are optimized for each of a plurality of types of light sources by repeating steps (a) to (f) for each of a plurality of given spectral radiances.

4. The matrix coefficient determining method according to claim 1, further comprising the step of:

(g) storing the 3×3 linear matrix coefficient and 2×2 color-difference matrix coefficient that are optimized for each of a plurality of types of light sources by repeating steps (a) to (f) for each of a plurality of given spectral radiances.

5. An image input apparatus having a signal processing system having a white balance correction unit, a linear matrix conversion unit which converts the R, G, and B color signals from the white balance correction unit by using a 3×3 linear matrix coefficient, a circuit which performs gamma correction and pixel interpolation calculation for the R, G, and B signals from the linear matrix conversion unit, a YC conversion unit which converts the R, G, and B signals from the circuit into luminance signal (Y) and color difference signal (Cr, Cb), and a color-difference matrix conversion unit which converts the color-difference signals Cr, Cb from the YC conversion unit by using a 2×2 color-difference matrix coefficient, the image input apparatus comprising:
- a light-source-type determining unit which determines the type of light source;
- a coefficient storage unit for storing a linear matrix coefficient and a color-difference coefficient optimized simultaneously with the matrix coefficient determining method according to claim 1, for each of a plurality of types of light sources,
- wherein the linear matrix conversion unit sets the linear matrix coefficient optimized for the determined type of light source; and
- the color-difference matrix conversion unit sets the color-difference matrix coefficient for the determined type of light source.

6. The image input apparatus according to claim 5, wherein the light-source-type determining unit determines the type of light source on the basis of spectral radiance.

7. The image input apparatus according to claim 6, wherein the matrix coefficient determining method further comprises the step of:
- (g) storing the 3×3 linear matrix coefficient and 2×2 color-difference matrix coefficient that are optimized for each of a plurality of types of light sources by repeating steps (a) to (f) for each of a plurality of given spectral radiances.

8. The image input apparatus according to claim 5, wherein step (f) of the matrix coefficient determining method obtains a 3×3 linear matrix coefficient and a 2×2 color-difference matrix coefficient that minimize the average value of distances obtained for the plurality of colors.

9. The image input apparatus according to claim 5, wherein the matrix coefficient determining method further comprises the step of:
- (g) storing the 3×3 linear matrix coefficient and 2×2 color-difference matrix coefficient that are optimized for each of a plurality of types of light sources by repeating steps (a) to (f) for each of a plurality of given spectral radiances.

* * * * *